A. P. GOULD.
MECHANICAL MOVEMENT FOR AGITATING BOLTERS AND GRAIN SPOUTS.
APPLICATION FILED MAY 31, 1917.
1,259,850.
Patented Mar. 19, 1918.
2 SHEETS—SHEET 1.
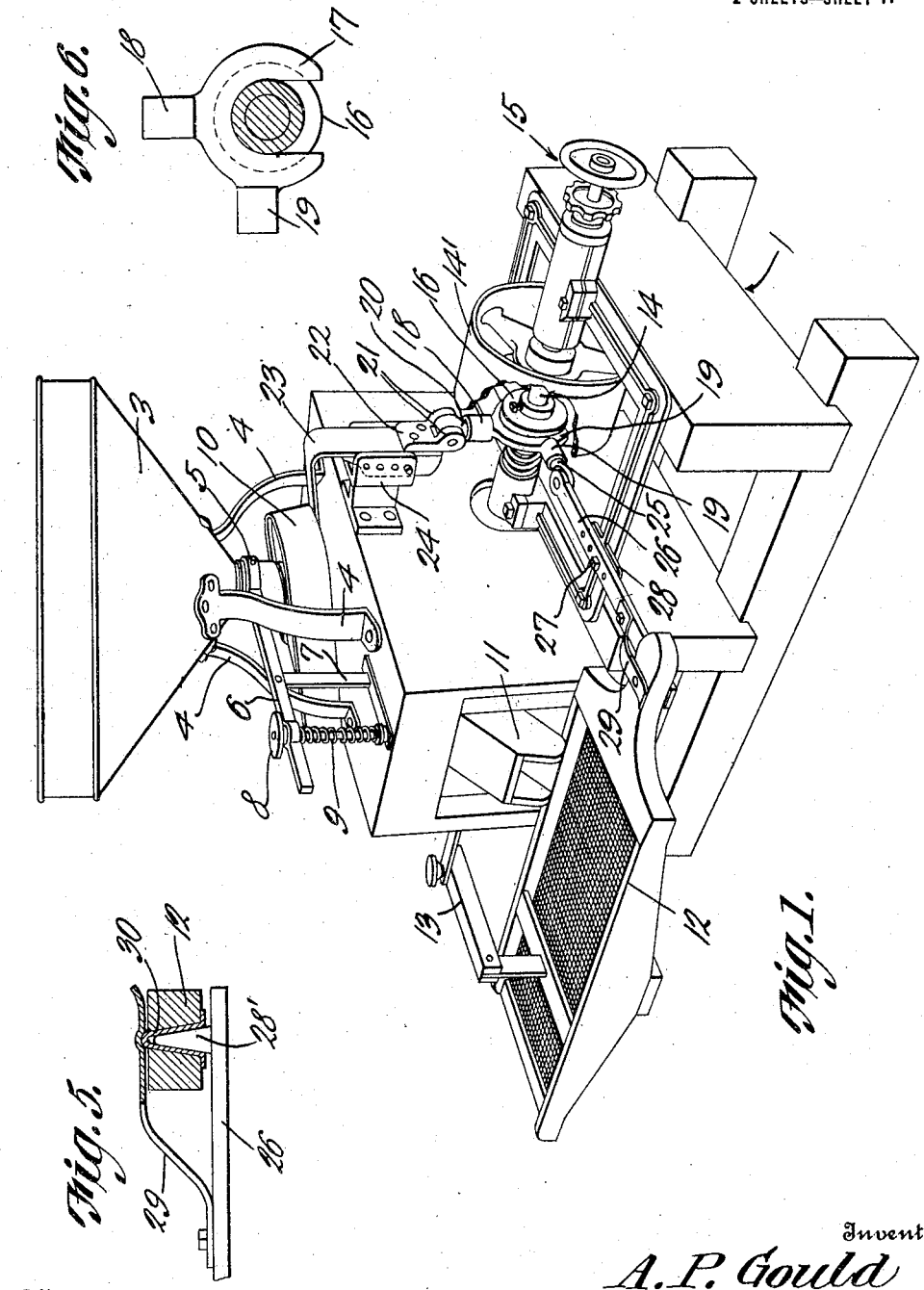
Witness
J. R. Elmer
H. A. Mitchell
Inventor
A. P. Gould
By C. A. Snow & Co.
Attorney A. P. GOULD.
MECHANICAL MOVEMENT FOR AGITATING BOLTERS AND GRAIN SPOUTS.
APPLICATION FILED MAY 31, 1917.
1,259,850.
Patented Mar. 19, 1918.
2 SHEETS—SHEET 2.
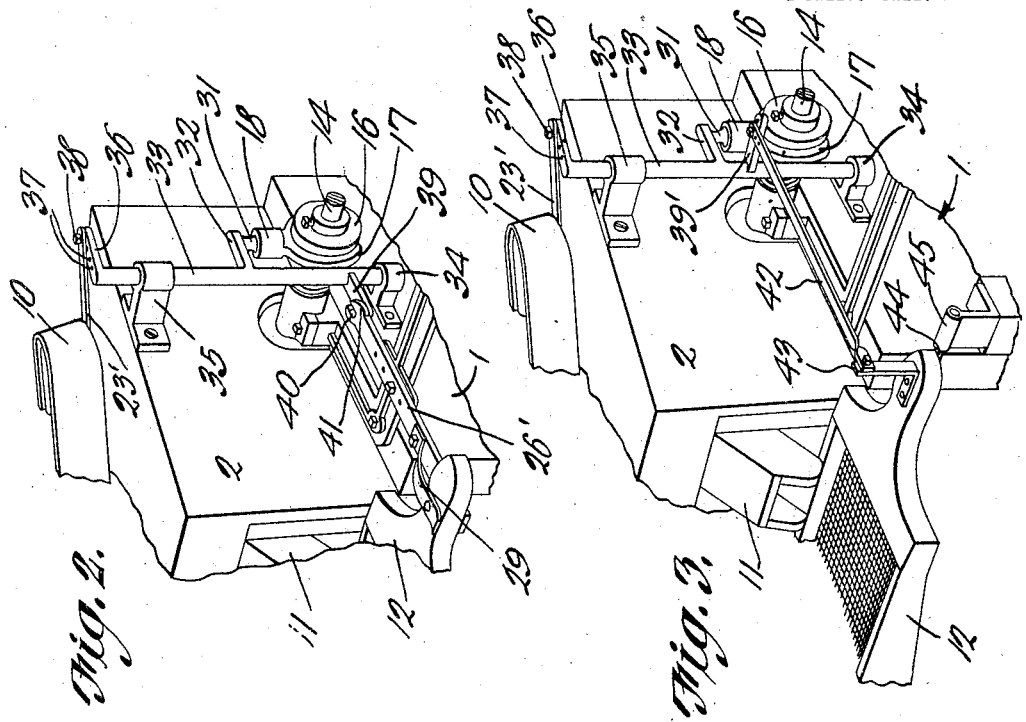
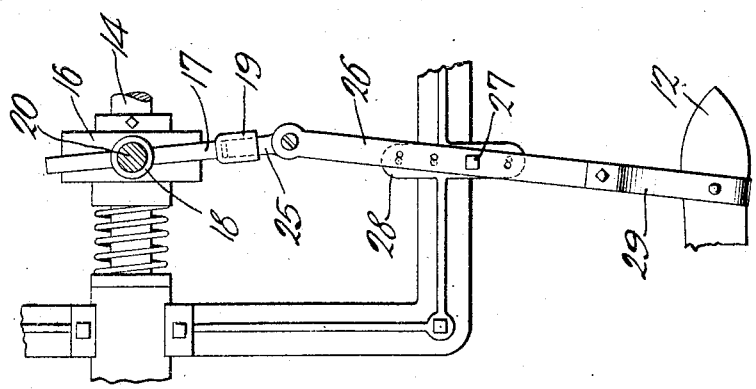
Witness
Inventor
A. P. Gould
By C. A. Snow & Co.
Attorney

UNITED STATES PATENT OFFICE.

AARON P. GOULD, OF NORTHWILKESBORO, NORTH CAROLINA.

MECHANICAL MOVEMENT FOR AGITATING BOLTERS AND GRAIN-SPOUTS.

1,259,850.     Specification of Letters Patent.     Patented Mar. 19, 1918.

Application filed May 31, 1917. Serial No. 171,991.

*To all whom it may concern:*

Be it known that I, AARON P. GOULD, a citizen of the United States, residing at Northwilkesboro, in the county of Wilkes and State of North Carolina, have invented a new and useful Mechanical Movement for Agitating Bolters and Grain-Spouts, of which the following is a specification.

The subject of this invention is a mechanism for agitating the bolter and grain spout of a mill wherein a cam groove engaging element is pivotally secured to an agitating lever and arm; and the objects of the invention are, first, to provide a collar adapted to engage a cam groove, second, to provide means for pivotally securing the collar to an agitating arm and lever, third, to provide a novel, detachable connection which will not wear loose and rattle, fourth, to provide a simple and efficient mechanism for the purpose set forth.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

Practical embodiments of the invention are shown in the accompanying drawings, wherein:—

Figure 1 is a perspective view of a mill with an agitating mechanism constructed in accordance with my invention in place thereon.

Fig. 2 is a perspective view of a portion of a mill and showing a modified form of the agitating mechanism.

Fig. 3 is a similar view showing another modification.

Fig. 4 is a detail plan view of the mechanism, the grain spout agitator being cut away.

Fig. 5 is a detail side elevation partly in section of the detachable connection for the bolter agitator.

Fig. 6 is a detail side elevation of the collar, the cam shaft shown in section.

Referring to the drawings by numerals:—

As the mill to which the mechanism is attached forms no part of the present invention, only sufficient description will be given thereof to convey a clear understanding of the connection and operation of the mechanism forming the subject of the present invention.

A supporting base, indicated generally at 1, is provided, and upon this base is secured a casing 2, which forms a housing for the burs of the mill and within which they turn. A hopper 3 is supported upon legs 4—4, above the casing 2. The hopper 3 has a depending discharge spout, the feed from which is controlled by a sleeve 5, carried on one end of a lever 6, which is fulcrumed on an arm 7 rising from the casing 2. The lever is actuated to regulate the feed by a hand nut 8 which is threaded on a rod which rises from the casing 2, and the lever is held in contact with the nut by a coiled spring 9, which surrounds the rod and is confined between the lever and the top of the casing 2. The hopper discharges into a grain spout, indicated at 10, and from this spout the cleaned and separated grain is fed to the burs by a feed spout, not shown. A discharge spout 11 leads from the casing 2 and conveys the ground meal from the burs to the bolter 12. The bolter is hung from a suitably supported bracket or hanger 13. A horizontal shaft 14 is journaled in suitable bearings secured to the base and to this shaft the runner bur is secured and upon this shaft the drive pulley 14' is mounted. The thrust wheel and jam nut, indicated generally at 15, are provided for the purpose of regulating the spacing of the burs and controlling the grade of the ground meal.

A cam sleeve 16 is mounted on the drive shaft 14 and the sleeve is formed with a cam groove to which is adapted a collar plate 17. The collar 17 is formed with journaling means here shown as a hub 18 and a hub 19 projecting radially from its periphery. A stub shaft 20 oscillates in the hub 18, and this stub shaft is pivotally hung between the ears 21 formed at one end of a block 22 which is secured to the end of a bent agitator arm 23. The arm 23 is pivotally secured to a bracket 24 which extends from one side of the casing 2, and supports, on its other end, the grain spout 10. A similar stub shaft 25 oscillates in the hub 19 and is pivotally secured to one end of a lever 26. The lever 26 is adjustably fulcrumed by a pin 27 on a bar 28 which forms part of a frame which is secured to the base. The other end of the lever 26 has a substantially conical stud 28' rising from it. A resilient finger 29 is pivoted to the lever 26 and overlies the stud. This end of the lever 26 is adapted to be detachably pivoted to the handle of the bolter 12. This handle is provided with an inserted conical cap 30 forming a socket adapted to receive the stud 28' and to be detachably retained in place thereon by the resilient finger 29. This connection takes up wear and prevents the parts rattling and forming a slot in the bolter handle.

In the modified form shown in Figs. 2 and 3, the hub 19 is removed from the collar 17 and the hub 18 receives a stub shaft 31 which turns therein and which is pivotally secured to a crank arm 32 which extends from a median point of a rock shaft 33. The rock shaft 33 is vertically disposed and has its lower end stepped in a bracket 34 which is secured to the base of the mill. The upper end of the shaft 33 is supported by a bracket 35 which is secured to the casing 2. A crank 36, provided with a series of apertures 37, extends from the upper end of the rock shaft 33 and is adjustably pivoted by a pin 38 to the agitator arm 23' of the grain spout. Another crank 39 extends from the lower portion of the rock shaft 33 and its pin 40 is engaged by the bifurcated end 41 of the bolter agitating lever 26'.

In the modification shown in Fig. 3, the parts are the same as just described with the exception of the crank 39' which is located somewhat higher up the shaft than the crank 39 was and at 90° to the position occupied by the crank 39. A link 42 is pivotally secured at one end to the crank 39' and its other end pivotally engages an arm 43 which is secured to and rises from the bolter handle. In this instance the bolter is provided with a trunnion 44 which turns in a suitably supported bearing 45. This gives the bolter a rocking instead of its usual reciprocating motion.

In practice, the invention operates in the following manner:—Referring particularly to Fig. 1: As the shaft revolves, the collar 17 will be moved so as to reciprocate the hub 18 toward and away from the casing 2. This rocks the arm 23 upon its pivot and causes an agitation of the grain spout. At the same time the hub 19 has been moved back and forth in a horizontal plane, rocking the lever 26 on its pin 27 and reciprocating the bolter 12.

When the modification shown in Fig 2 is used, the movement of the hub 18, just described, will cause the shaft 33 to be rocked. This will reciprocate, through the crank 36 and arm 23', the grain spout. Motion will also be imparted through the crank 39 and lever 26' to the bolter.

With the modification shown in Fig. 3, the same action takes place with the exception that the link 42 is reciprocated by the crank 39' and rocks the bolter upon its trunnion 44.

By making the fork in the form of a plate, a larger bearing surface is provided which avoids rapid wear and prevents loosening and rattling of the parts. The spring pressed conical connection between the lever and bolter handle also compensates for wear and prevents the parts becoming loose and working to form the opening into a slot.

Having described my invention, what I claim as new and desire to secure by Letters Patent, is:—

1. In a mill, the combination of a casing, a drive shaft, a grooved cam on the drive shaft, a forked plate adapted to the groove, hubs on the plate, agitating arms pivotally secured to the casing, and stub shafts pivotally secured to the agitating arms and oscillating in the hubs.

2. In a mill, the combination of a casing, a drive shaft, a grooved cam on the drive shaft, a collar adapted to the groove, a hub on the collar, brackets secured to the casing, a rock shaft journaled in the brackets, crank arms on the rock shaft, a stub shaft secured to one of the crank arms and oscillating in the hub, and agitating arms secured to the other crank arms.

3. In a mill, the combination of a casing, a drive shaft, a grooved cam on the drive shaft, a collar adapted to the groove, hubs on the collar, agitating arms pivotally secured to the casing, and stub shafts pivotally secured to the agitating arms and oscillating in the hubs.

In testimony that I claim the foregoing as my own, I have hereto affixed my signature in the presence of two witnesses.

AARON P. GOULD.

Witnesses:
J. D. MOORE,
HESTER PARKER.